United States Patent [19]

Schindl

[11] Patent Number: 4,544,242

[45] Date of Patent: Oct. 1, 1985

[54] OPTICAL DEFLECTING DEVICE

[75] Inventor: Klaus Schindl, Vienna, Austria

[73] Assignee: C. Reichert Optische Werke AG, Vienna, Austria

[21] Appl. No.: 504,655

[22] Filed: Jun. 15, 1983

[30] Foreign Application Priority Data

Jun. 18, 1982 [DE] Fed. Rep. of Germany ....... 3222816

[51] Int. Cl.⁴ .............................................. G02B 21/36
[52] U.S. Cl. .................................................... 350/486
[58] Field of Search ......................................... 350/486

[56] References Cited

U.S. PATENT DOCUMENTS 2,625,853 1/1953 Hayward ............................. 350/539
4,436,384 3/1984 Taira .................................... 350/515

FOREIGN PATENT DOCUMENTS 2502209 8/1975 Fed. Rep. of Germany.

Primary Examiner—John K. Corbin
Assistant Examiner—Rebecca D. Gass
Attorney, Agent, or Firm—Alan H. Spencer; Stephen Raines

[57] ABSTRACT

In an optical deflecting device with an optical bridge and with two optical sub-units which can be rotated relative to the optical bridge, the optical sub-units are, in the datum position, aligned in a manner such that the optical entrance axis of the first optical sub-unit is substantially perpendicular to the optical exit axis of the second optical sub-unit and substantially parallel to the optical axis of the optical bridge. This arrangement enables a light beam to be deflected without altering the orientation of the image.

1 Claim, 3 Drawing Figures

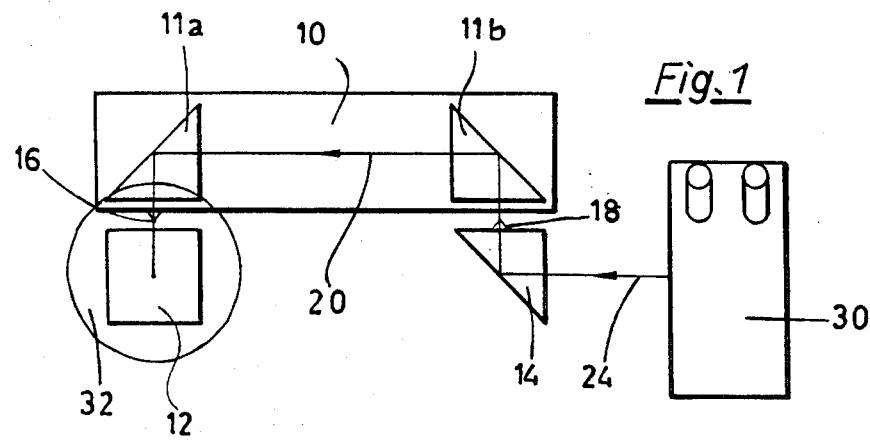
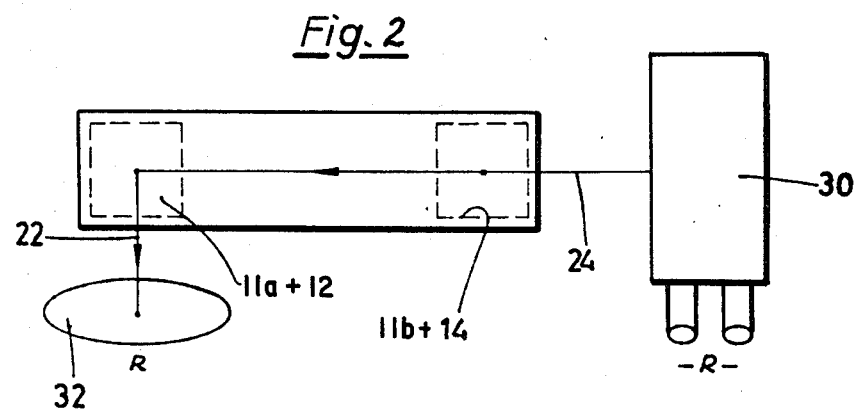
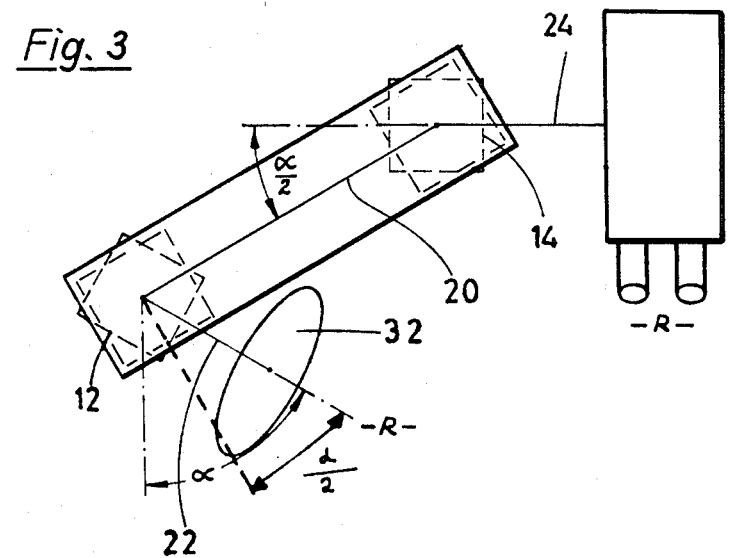

OPTICAL DEFLECTING DEVICE

BACKGROUND OF THE INVENTION

The invention relates to an optical deflecting device.

It is known to provide optical deflecting devices in which a first optical sub-unit for deflecting a light beam, a second optical sub-unit for deflecting a light beam, and an optical bridge between the optical exit axis of the first optical sub-unit and the optical entrance axis of the second optical sub-unit, the axes being parallel with one another and, starting from reference positions of the sub-units about their respective axes, relative to the optical bridge, the angle of the first optical sub-unit, about its optical exit axis, being equal to the angle of the second optical sub-unit, about its optical entrance axis.

An optical deflecting device of this type has, for example, been disclosed in German Offenlegungsschrift No. 2,502,209. The known device is integrated into a binocular tube of an optical observation instrument in order to prevent rotation of the image when the tube is moved relative to the stationary body of the optical observation instrument, this image-rotation normally occurring as the eyepiece tubes are moved. In the known device, the optical sub-units, which take the form of split-cube prisms, are, in the imaginary datum position, aligned in a manner such that the optical entrance axis of the first optical sub-unit extends along the same line as the optical exit axis of the second optical sub-unit, but in the opposite direction, and the optical bridge comprises a split-cube prism and a pentagonal prism possessing a top edge so that an image is rotated once through 180°. By this means the observer does not see the object under observation inverted, which, in the case of a microscope, makes it difficult to handle the object under observation.

If the known optical deflecting device is to be used in order to project an erect and laterally non-reversed image onto a projection screen which is parallel to the object carrier, this image being extracted from a microscope by, for example, a reflecting system, it is necessary to couple further split-cube prisms to the second split-cube prism, and this is expensive.

OBJECTS OF THE INVENTION

An object of the invention is to provide an optical deflecting device whereby a light beam can be deflected, in the simplest possible manner, through an angle greater than 0° and less than 180°, and in particular through 90°, without the occurence of image-rotation or image-reversal. It is also an object of the invention to provide an optical deflecting device which would be particularly suitable for the projection onto a projection screen of an object which is observed by means of a microscope.

BRIEF DESCRIPTION OF THE INVENTION

According to the present invention we provide an optical deflecting device comprising a first optical sub-unit for deflecting a light beam, a second optical sub-unit for deflecting a light beam, and an optical bridge between the optical exit axis of the first optical sub-unit and the optical entrance axis of the second optical sub-unit, the improvement that, in the imaginary datum position, the optical entrance axis of the first optical sub-unit extends substantially perpendicular to the optical exit axis of the second optical sub-unit, and in the same plane as the axis of the optical bridge.

BRIEF DESCRIPTION OF THE DRAWINGS

Further advantages, details, and features of the invention are evident from the following description of a preferred embodiment, reference being made to the drawing, in which:

FIG. 1 is a side view of an optical deflecting device according to the invention, in the datum position;

FIG. 2 is a plan view of the optical deflecting device shown in FIG. 1; and

FIG. 3 is a plan view of the optical deflecting device, in a position which has been rotated out of the position shown in FIG. 1.

DETAILED DESCRIPTION OF THE INVENTION

An optical bridge 10, with two split-cube prisms 11a and 11b, is shown in FIG. 1, together with two optical sub-units 12 and 14, each of which comprises a split-cube prism. The optical entrance axis 16 of the split-cube prism 12 extends parallel with the optical exit axis 18 of the split-cube prism 14. The split-cube prisms 12 and 14 can be rotated about the optical axes 16 and 18.

It is also possible for a plurality of reflections to take place in the optical sub-units in which the optical entrance axis can also assume angles relative to the optical exit axis which depart from 90°. Similar considerations apply in the case of the optical bridge. Here, too, more than two reflections could, theoretically, take place. Furthermore, it is not necessary that the optical axis 20 of the optical bridge be positioned at 90° to the optical entrance axis of the sub-unit 12, as well as at 90° to the optical exit axis 18 of the sub-unit 14.

The datum position of the optical deflecting device is particularly evident from FIG. 2. From this Figure it can easily be seen that the optical entrance axis 24 of the first optical sub-unit 14 is perpendicular to the optical exit axis 22 of the second optical sub-unit 12.

An image of the object under observation by a microscope 30 is extracted by means of a reflecting system, this image being projected onto a projection screen 32 with the aid of the optical deflecting device. Here, the orientation of the image is illustrated in the drawing by "R".

FIG. 3 illustrates a position which deviates from the datum position represented in FIGS. 1 and 2. From FIG. 3 it can be seen that, starting from the datum positions of the sub-units, 12 and 14, about their respective axes 16 and 18, as shown in FIGS. 1 and 2, the angle $\alpha/2$ of the first optical sub-unit 14, about its optical entrance axis 18, is equal to the angle $\alpha/2$ of the second optical sub-unit 12, about its optical exit axis 16, but is in the opposite direction. There then results, in total, a rotation about an angle $\alpha$, between the entrance axis 24 and the exit axis 22 of the optical deflecting device.

The optical deflecting device, according to the invention, can be applied in a multiplicity of ways, and additional optical elements (e.g. lenses) can be arranged between the reflecting surfaces of the optical bridge and along the exit and entrance axes. In a simplified embodiment, the optical sub-units may be connected to the optical bridge in a manner which does not permit rotation.

It will be apparent that further modifications of the invention, as described above, may be made within the scope of the claims. For example, the prisms of the optical sub-units and/or the optical bridge may, if desired, be replaced by mirrors.

I claim:

1. A microscope projection system comprising a microscope, a microscope exit axis having a portion extending in a upwardly vertical direction, a projection screen horizontally spaced from said microscope, a downwardly extending vertical entrance axis, a deflector to direct light from said entrance axis to said screen and a horizonally extending optical bridge connecting said portion of the exit axis to said entrance axis, said optical bridge having two reflective surfaces, one of said reflective surfaces deflecting light received from said portion in a horizonal direction and the other reflective surface deflecting light received from said one reflective surface along the projection of said entrance axis, said optical bridge being rotatable about said portion and said projection screen being rotatable about said entrance axis.

* * * * *